United States Patent
Wang et al.

(10) Patent No.: US 8,608,346 B2
(45) Date of Patent: Dec. 17, 2013

(54) BACKLIGHT MODULE AND LIGHT GUIDE PLATE FIXTURE THEREOF

(75) Inventors: Lifeng Wang, Shenzhen (CN); Yajun Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 404 days.

(21) Appl. No.: 13/128,172

(22) PCT Filed: Apr. 14, 2011

(86) PCT No.: PCT/CN2011/072817
§ 371 (c)(1),
(2), (4) Date: May 6, 2011

(87) PCT Pub. No.: WO2012/139296
PCT Pub. Date: Oct. 18, 2012

(65) Prior Publication Data
US 2012/0257405 A1 Oct. 11, 2012

(30) Foreign Application Priority Data
Apr. 11, 2011 (CN) .......................... 2011 1 0089952

(51) Int. Cl.
*F21V 29/00* (2006.01)
(52) U.S. Cl.
USPC ........... 362/294; 362/218; 362/612; 362/633; 362/634
(58) Field of Classification Search
USPC .......... 362/218, 294, 612, 613, 615, 630–634
See application file for complete search history.

(56) References Cited

U.S. PATENT DOCUMENTS

| | | | | |
|---|---|---|---|---|
| 7,441,938 B2 * | 10/2008 | Sakai et al. | ................... | 362/634 |
| 2012/0195069 A1 * | 8/2012 | Yeh et al. | ...................... | 362/612 |

FOREIGN PATENT DOCUMENTS

| | | |
|---|---|---|
| CN | 101008746 A | 8/2007 |
| CN | 101059623 A | 10/2007 |
| CN | 101520574 A | 9/2009 |
| CN | 101589267 A | 11/2009 |
| CN | 101978208 A | 2/2011 |
| JP | 2001125073 A | 5/2001 |

OTHER PUBLICATIONS

JFJ Van Rensburg et al. "Double-Boost DC to DC Converter" Industrial Electronics, 2008. IECON 2008. 34th Annual Conference of IEEE. Jan. 23, 2009. p. 707-711.

* cited by examiner

*Primary Examiner* — Stephen F Husar
(74) *Attorney, Agent, or Firm* — Sughrue Mion, PLLC

(57) ABSTRACT

The present invention discloses a backlight module and a light guide plate (LGP) fixture thereof, wherein the LGP fixture comprises a LGP, a heat dissipation base and a plurality of clamps. The heat dissipation base is planar and correspondingly disposed below the LGP. The heat dissipation base is installed with the clamps on sides of the LGP. Each of the clamps has a bottom portion, and a retaining plate and at least one upright plate are vertically formed from the bottom portion. The upright plate and the retaining plate are clamped on the heat dissipation base, and the clamps are used to position the LGP.

20 Claims, 7 Drawing Sheets

BACKLIGHT MODULE AND LIGHT GUIDE PLATE FIXTURE THEREOF

FIELD OF THE INVENTION

The present invention relates to a backlight module and a light guide plate fixture thereof, and more particularly to a backlight module and a light guide plate fixture thereof having a plurality of clamps to position a light guide plate (LGP).

BACKGROUND OF THE INVENTION

Referring now to FIG. 1, an exploded perspective view of a traditional backlight module structure is illustrated. As shown in FIG. 1, a backlight module 100 comprises a positioning frame 102, a light guide plate (LGP) 104 and a set of stacked optical films 106. For example, the optical films 106 can be a diffuser sheet 108, a prism brightness enhancement film of X axis 110a and a prism brightness enhancement film of Y axis 110b. The positioning frame 102 is formed with a plurality of notches 112. Meanwhile, the LGP 104 is formed with LGP flanges 104a corresponding to the notches 112, and each of the optical films 106 is formed with film flanges 114 corresponding to the notches 112, wherein the LGP 104 and the optical films 106 are placed into the notches 112 of the positioning frame 102 through the alignment between the notches 112, the LGP flanges 104a and the film flanges 114. Thus, the LGP 104 and the optical films 106 can be horizontally retained in the positioning frame 102.

However, the outline of the LGP 104 and the optical films 106 of the backlight module must provide structures of flanges or notches, which are formed by forming and then cutting the LGP 104 and the optical films 106, so that the cost is relatively high due to the cutting operation.

As a result, it is necessary to provide a backlight module and a light guide plate fixture thereof to solve the problems existing in the conventional technologies, as described above.

SUMMARY OF THE INVENTION

A primary object of the present invention is to provide a backlight module and a light guide plate fixture thereof, wherein a heat dissipation base is installed with a plurality of clamps on sides of a LGP, so that the clamps can be used to position the LGP.

To achieve the above object, the present invention provides a light guide plate (LGP) fixture of a backlight module, wherein the LGP fixture comprises:

a LGP;

a heat dissipation base being planar and correspondingly disposed below the LGP, wherein at least one side of the heat dissipation base is formed with an upright wall extended upward therefrom, and the upright wall is provided with a light source assembly which has a light emitting direction facing a light input surface of the LGP; and a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the penetration portion is a close slot; the upright plate and the retaining plate are clamped on the heat dissipation base; and the clamps corresponding to each other position the LGP.

To achieve the above object, the present invention further provides a light guide plate (LGP) fixture of a backlight module, wherein the LGP fixture comprises:

a LGP;

a heat dissipation base being planar and correspondingly disposed below the LGP, wherein at least one side of the heat dissipation base is formed with an upright wall extended upward therefrom; and a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the upright plate and the retaining plate are clamped on the heat dissipation base; and the clamps corresponding to each other position the LGP.

To achieve the above object, the present invention further provides a backlight module which comprises:

a LGP;

a heat dissipation base being planar and correspondingly disposed below the LGP, wherein at least one side of the heat dissipation base is formed with an upright wall extended upward therefrom;

a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the upright plate and the retaining plate are clamped on the heat dissipation base; and the clamps corresponding to each other position the LGP;

a back plate disposed below the heat dissipation base to cover the heat dissipation base and the clamps; and a housing fixing the LGP from top to bottom.

In one embodiment of the present invention, the upright wall is provided with a light source assembly which has a light emitting direction facing a light input surface of the LGP.

In one embodiment of the present invention, an upper surface of the heat dissipation base further comprises a plurality of first ribs and second ribs, wherein the first ribs are disposed below the LGP to support the LGP, and the second ribs are disposed between the upright wall and the penetration portion of the heat dissipation base to abut against the retaining plate.

In one embodiment of the present invention, the second rib is provided with a light source assembly thereon, and the light source assembly has a light emitting direction facing a light input surface of the LGP.

In one embodiment of the present invention, the retaining plate of the clamp is formed with an elastic tab facing the second rib of the heat dissipation base, and the elastic tab abuts against the second rib of the heat dissipation base to enhance the stability of the clamp.

In one embodiment of the present invention, the retaining plate of the clamp is formed with an elastic tab facing the LGP, and the elastic tab abuts against the LGP to enhance the stability of the LGP.

In one embodiment of the present invention, the bottom portion of the clamp is formed with an opening, and the heat dissipation base is correspondingly formed with a thread hole, so that a screw member can be provided to fix the clamp on the heat dissipation base.

In one embodiment of the present invention, the penetration portion of the heat dissipation base is a close slot.

In one embodiment of the present invention, the penetration portion of the heat dissipation base is an open notch.

According to the backlight module and the light guide plate fixture of the present invention, it is not necessary to form structures of flanges or notches on the LGP, so as to save the cutting operation and lower the cost. Furthermore, in comparison with another traditional process which fixes a LGP by an entire housing, the present invention which uses clamps to position a plurality of points of the LGP can further save the manufacture cost.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
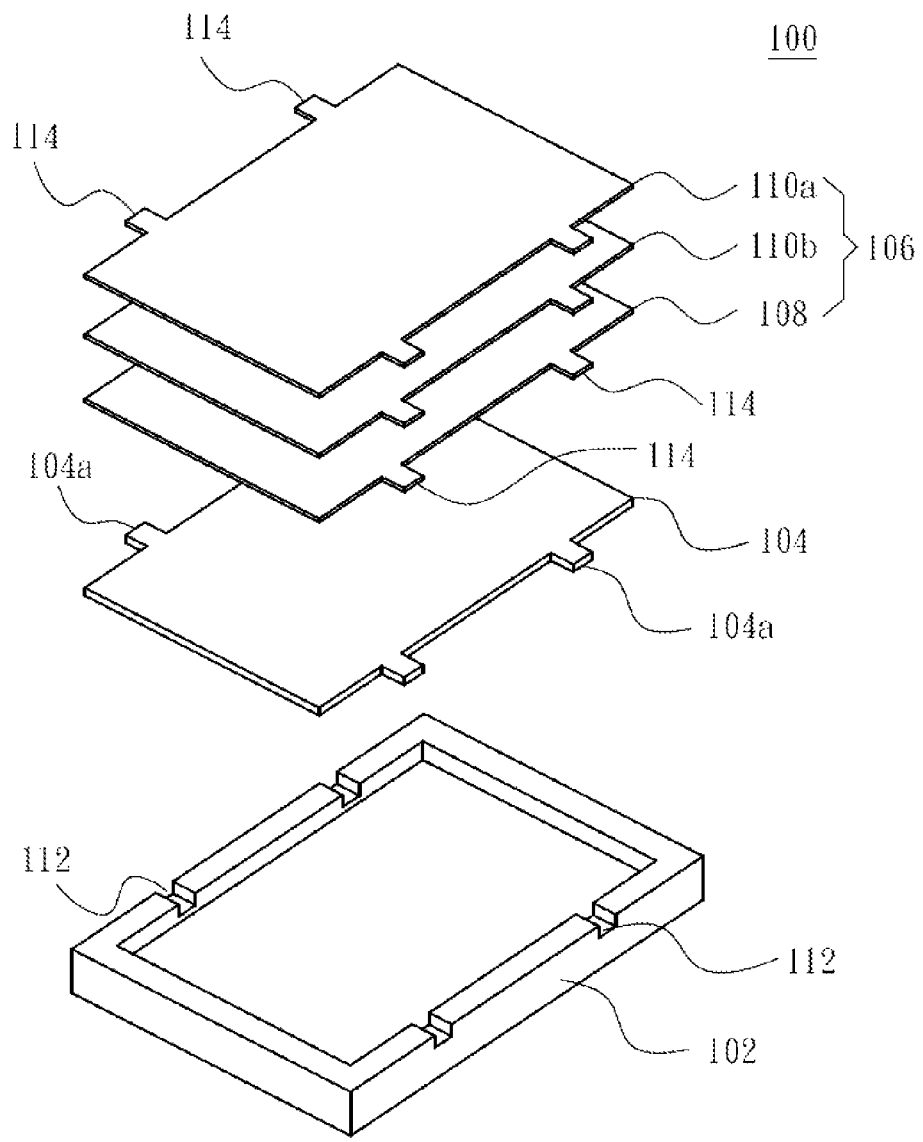
FIG. 1 is an exploded perspective view of a traditional backlight module structure.
Figure 2:
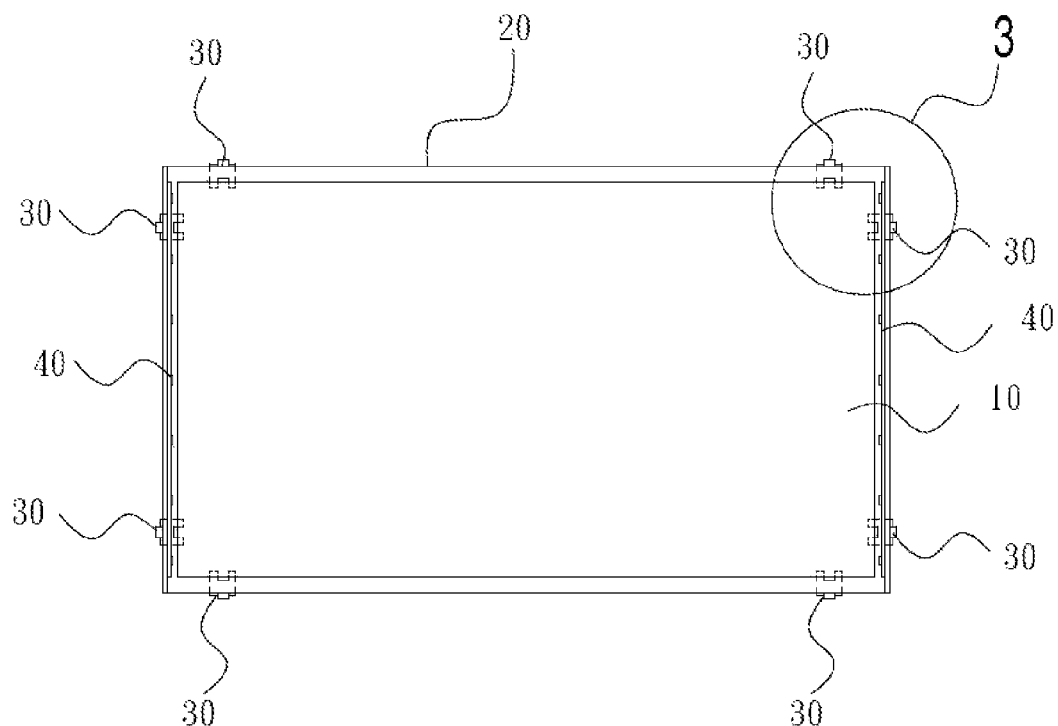
FIG. 2 is a top view of a backlight module according to a first embodiment of the present invention.
Figure 3:
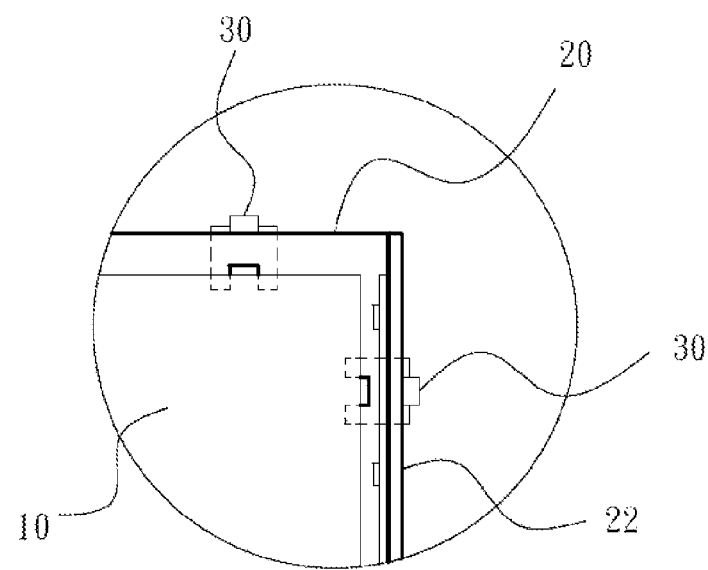
FIG. 3 is a partially enlarged view of FIG. 2.

Referring now to FIGS. 2 and 3, FIG. 2 is a top view of a backlight module according to a first embodiment of the present invention; and FIG. 3 is a partially enlarged view of FIG. 2. A backlight module comprises a light guide plate (LGP) 10, a heat dissipation base 20 and a plurality of clamps 30. The heat dissipation base 20 is planar and correspondingly disposed below the LGP 10, and the heat dissipation base 20 is installed with at least one of the clamps 30 on each of four sides of the LGP 10. As shown in FIG. 2, for example, each side can be installed with two of the clamps 30, which are close to two ends of the LGP 10, respectively. The clamps 30 disposed at the four sides can abut against the sides of the LGP 10, so as to position the LGP 10. In addition, the left and right sides of the heat dissipation base 20 can be further installed with a light source assembly 40, wherein the detailed installation thereof will be described hereinafter.

Furthermore, in the present invention, the number of the clamps 30 and the specific position thereof in relation to the sides of the LGP 10 are not limited thereto, but the clamps 30 are at least disposed on a pair of opposite sides of the LGP 10 to position the LGP 10. Moreover, the basic require of installing the clamps 30 is not to impede the light of the light source assembly 40 from emitting into the LGP 10.

Figure 4A:
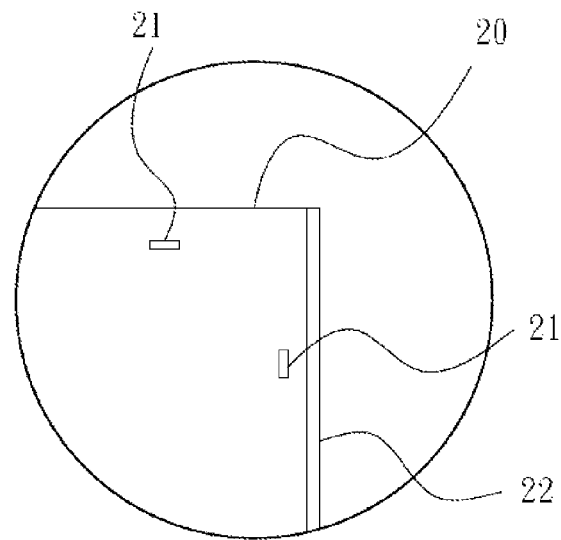
FIG. 4A is a partially enlarged top view of a heat dissipation base according to the backlight module of the first embodiment of the present invention.
Figure 4B:
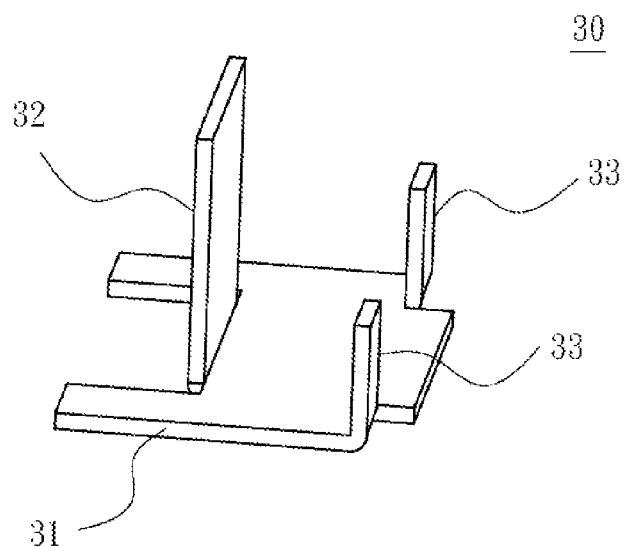
FIG. 4B is a perspective view of a clamp according to the backlight module of the first embodiment of the present invention.
Figure 4C:
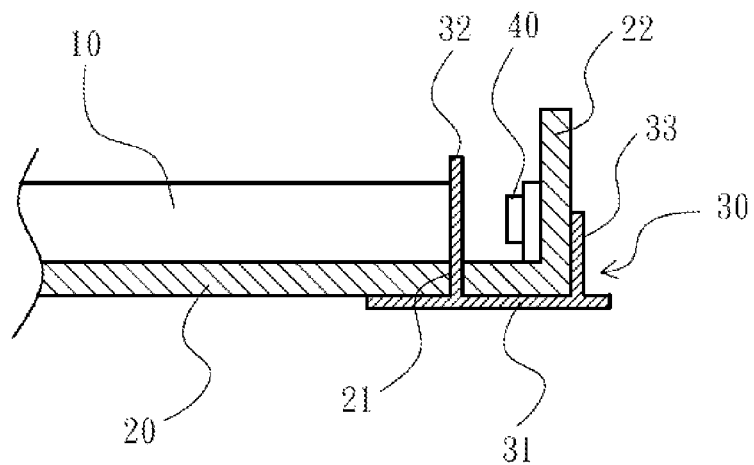
FIG. 4C is a cross-sectional side view of a LGP fixture according to the backlight module of the first embodiment of the present invention.

Referring now to FIGS. 4A, 4B and 4C, FIG. 4A is a partially enlarged top view of a heat dissipation base according to the backlight module of the first embodiment of the present invention; FIG. 4B is a perspective view of a clamp according to the backlight module of the first embodiment of the present invention; and FIG. 4C is a cross-sectional side view of a LGP fixture according to the backlight module of the first embodiment of the present invention. The heat dissipation base 20 is formed with a plurality of penetration portions 21 and at least one upright wall 22 extended upward from the side thereof, wherein each of the penetration portions 21 is a close slot. Each of the clamps 30 comprises a bottom portion 31, and a retaining plate 32 and at least one upright plate 33 are vertically formed from the bottom portion 31. For example, FIG. 4B shows two of the upright plates 33, while there is a distance between the retaining plate 32 and the upright plates 33. As shown in FIG. 4C, the upright plate 33 of the clamp 30 abuts against the upright wall 22 of the heat dissipation base 20, while the retaining plate 32 passes through one of the penetration portions 21 of the heat dissipation base 20, wherein the upright plates 33 and the retaining plate 32 clamp the heat dissipation base 20, and the clamps 30 correspondingly disposed on two opposite sides of the LGP 10 can be used to position the LGP 10.

Preferably, the clamp 30 is a stamped metal plate. As shown in FIG. 4B, for conveniently bending to form the retaining plate 32 and the upright plates 33, the clamp 30 may have a plurality of protrusions (unlabeled), but the present invention is not limited thereto.

Preferably, an inner side of the upright wall 22 is provided with a light source assembly 40 which has a light emitting direction facing a light input surface of the LGP 10.

Figure 5A:
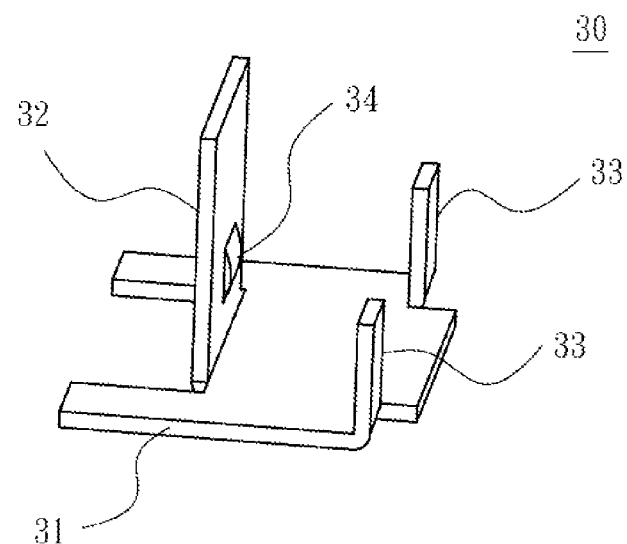
FIG. 5A is a perspective view of a clamp according to a backlight module of a second embodiment of the present invention.
Figure 5B:
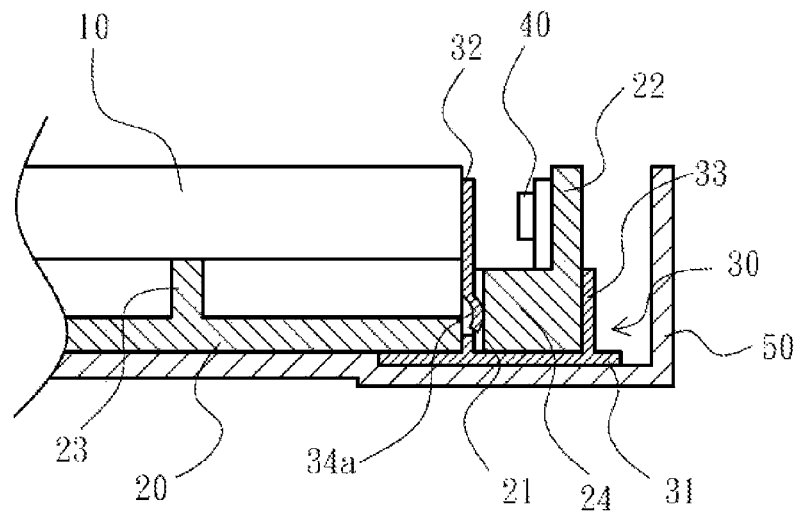
FIG. 5B is a cross-sectional side view of a LGP fixture according to the backlight module of the second embodiment of the present invention.

Referring now to FIGS. 5A and 5B, FIG. 5A is a perspective view of a clamp according to a backlight module of a second embodiment of the present invention; and FIG. 5B is a cross-sectional side view of a LGP fixture according to the backlight module of the second embodiment of the present invention. The LGP fixture of the backlight module according to the second embodiment of the present invention is similar to the LGP fixture of the backlight module according to the first embodiment of the present invention, so that the second embodiment uses similar terms, but the difference therebetween is that: in the embodiment, an upper surface of the heat dissipation base 20 further comprises a plurality of first ribs 23 and second ribs 24, wherein the first ribs 23 are disposed below the LGP 10 to support the LGP 10, and the second ribs 24 are disposed between the upright wall 22 and the penetration portion 21 of the heat dissipation base 20 to abut against the retaining plate 32.

Preferably, the second rib 24 is provided with a light source assembly 40 thereon, i.e. the light source assembly 40 can be attached to the inner side of the upright wall 22 or also can be attached to and mounted on the second ribs 24. The light source assembly 40 has a light emitting direction facing a light input surface of the LGP 10.

Preferably, as shown in FIG. 5B, the retaining plate 32 of the clamp 30 is formed with an elastic tab 34*a* facing the second rib 24 of the heat dissipation base 20, and the elastic tab 34*a* abuts against the second rib 24 of the heat dissipation base 20 to enhance the stability of the clamp 30.

In addition, the backlight module further comprises a back plate 50, wherein the back plate 50 is disposed below the heat dissipation base 20 and used to cover the heat dissipation base 20 and the clamps 30.

Figure 6:
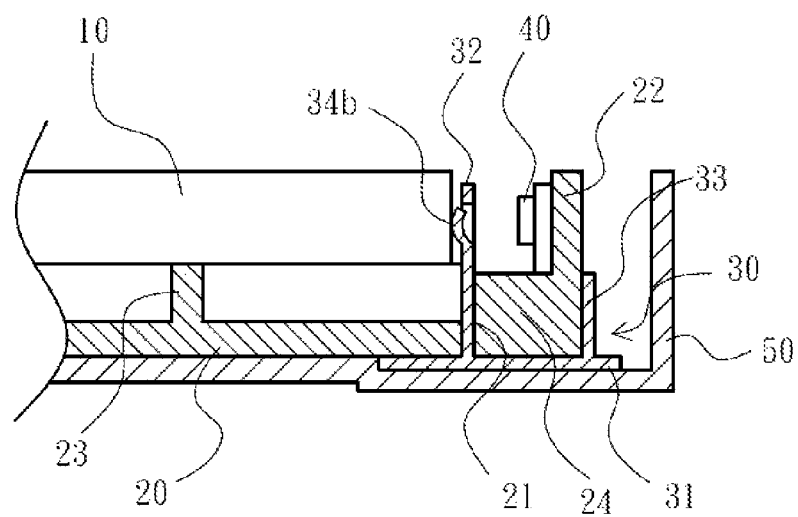
FIG. 6 is a cross-sectional side view of a LGP fixture according to a backlight module of a third embodiment of the present invention.

Referring now to FIG. 6, FIG. 6 is a cross-sectional side view of a LGP fixture according to a backlight module of a third embodiment of the present invention. The LGP fixture of the backlight module according to the third embodiment of the present invention is similar to the LGP fixture of the backlight module according to the second embodiment of the present invention, so that the third embodiment uses similar terms, but the difference therebetween is that: the retaining plate 32 of the clamp 30 is formed with an elastic tab 34*b* facing the LGP 10, and the elastic tab 34*b* abuts against the LGP 10 to enhance the stability of the LGP 10.

Figure 7A:
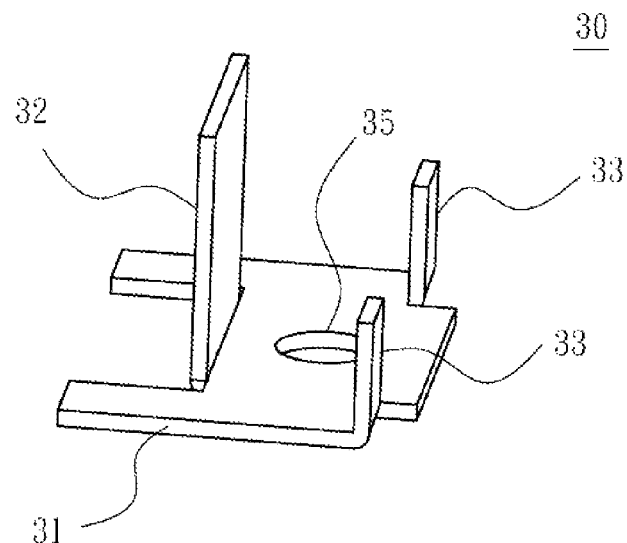
FIG. 7A is a perspective view of a clamp according to a backlight module of a fourth embodiment of the present invention.
Figure 7B:
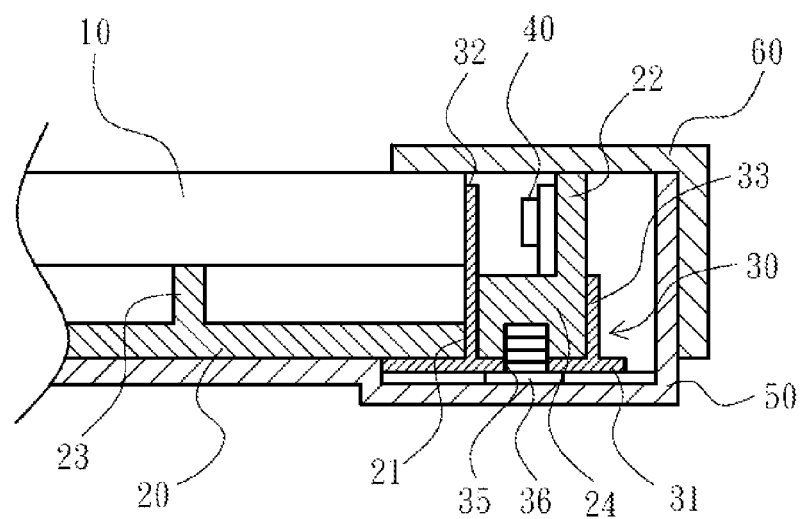
FIG. 7B is a cross-sectional side view of a LGP fixture according to the backlight module of the fourth embodiment of the present invention.

Referring now to FIGS. 7A and 7B, FIG. 7A is a perspective view of a clamp according to a backlight module of a fourth embodiment of the present invention; and FIG. 7B is a cross-sectional side view of a LGP fixture according to the backlight module of the fourth embodiment of the present invention. The LGP fixture of the backlight module according to the fourth embodiment of the present invention is similar to the LGP fixture of the backlight module according to the first embodiment and the second embodiment of the present invention, so that the fourth embodiment uses similar terms, but the difference therebetween is that: in the embodiment, the bottom portion 31 of the clamp 30 is formed with an opening 35, and the heat dissipation base 20 is correspondingly formed with a thread hole (unlabeled), so that a screw member 36 can be provided to fix the clamp 30 on the heat dissipation base 20.

In addition, the backlight module further comprises a housing 60 which is used to fix the LGP 10 from top to bottom.

Figure 8:
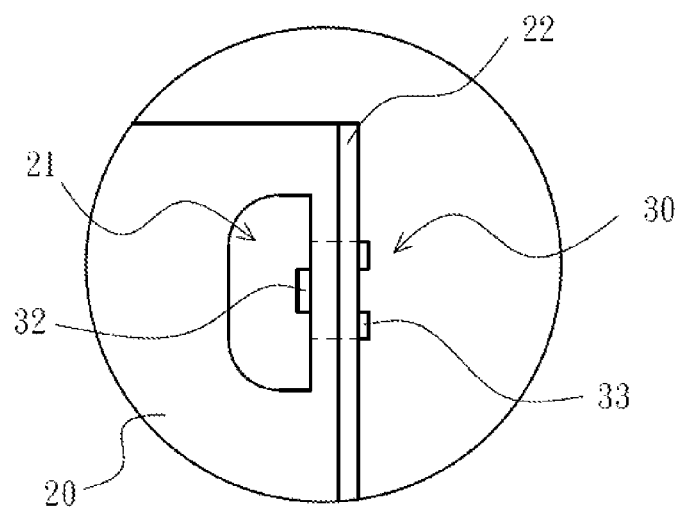
FIG. 8 is a partially enlarged top view of a heat dissipation base according to a backlight module of a fifth embodiment of the present invention.

Referring now to FIG. 8, FIG. 8 is a partially enlarged top view of a heat dissipation base according to a backlight module of a fifth embodiment of the present invention. The LGP fixture of the backlight module according to the fifth embodiment of the present invention is similar to the LGP fixture of the backlight module according to the first embodiment of the present invention, so that the fifth embodiment uses similar terms, but the difference therebetween is that: as shown in FIG. 8, although the penetration portion 21 of the heat dissipation base 20 is still a close slot, the slot can be not completely corresponding to the cross-sectional shape of the retaining plate 32 of the clamp 30, wherein as shown, only a rightmost edge of the penetration portion 21 is installed with the retaining plate 32 of the clamp 30 to provide a clamping function.

Figure 9:
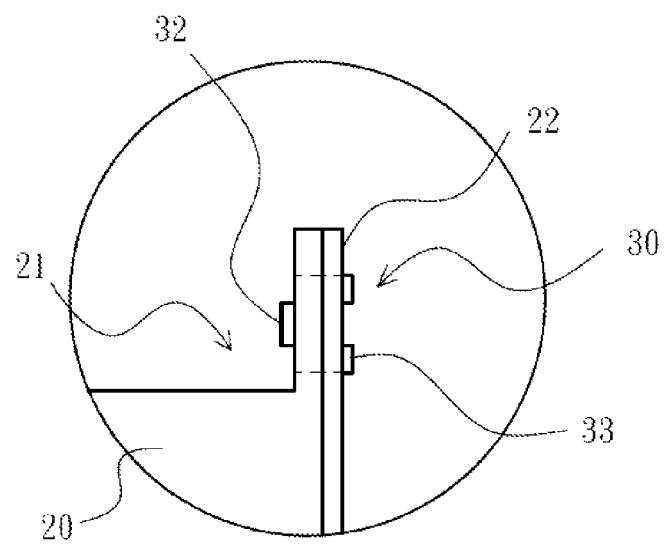
FIG. 9 is a partially enlarged top view of a heat dissipation base according to a backlight module of a sixth embodiment of the present invention.

Referring now to FIG. 9, FIG. 9 is a partially enlarged top view of a heat dissipation base according to a backlight module of a sixth embodiment of the present invention. The LGP fixture of the backlight module according to the sixth embodiment of the present invention is similar to the LGP fixture of the backlight module according to the first embodiment of the present invention, so that the sixth embodiment uses similar terms, but the difference therebetween is that: as shown in FIG. 9, the penetration portion 21 of the heat dissipation base 20 is an open notch, wherein as shown, only a rightmost edge of the penetration portion 21 is installed with the retaining plate 32 of the clamp 30 to provide a clamping function.

As described above, in comparison with the traditional LGP fixture of the backlight module, the backlight module of the present invention comprises a LGP, a heat dissipation base and a plurality of clamps, wherein the heat dissipation base is planar and correspondingly disposed below the LGP, the heat dissipation base is installed with the clamps on sides of the LGP; and each of the clamps has a bottom portion; a retaining plate and at least one upright plate are vertically formed from the bottom portion; the upright plate and the retaining plate are clamped on the heat dissipation base; and the clamps corresponding to each other are used to position the LGP. Thus, it is not necessary to form structures of flanges or notches on the LGP, so as to save the cutting operation and lower the cost.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A light guide plate (LGP) fixture of a backlight module, characterized in that: the LGP fixture comprises:
   a LGP;
   a heat dissipation base being planar and correspondingly disposed below the LGP, wherein at least one side of the heat dissipation base is formed with an upright wall extended upward therefrom, and the upright wall is provided with a light source assembly which has a light emitting direction facing a light input surface of the LGP; and
   a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the penetration portion is a close slot; the upright plate and the retaining plate are clamped on the heat dissipation base; and the clamps corresponding to each other position the LGP.

2. The LGP fixture of the backlight module according to claim 1, characterized in that: an upper surface of the heat dissipation base further comprises a plurality of first ribs and second ribs, wherein the first ribs are disposed below the LGP to support the LGP, and the second ribs are disposed between the upright wall and the penetration portion of the heat dissipation base to abut against the retaining plate.

3. The LGP fixture of the backlight module according to claim 2, characterized in that: the retaining plate of the clamp is formed with an elastic tab facing the second rib of the heat dissipation base, and the elastic tab abuts against the second rib of the heat dissipation base to enhance the stability of the clamp.

4. The LGP fixture of the backlight module according to claim 1, characterized in that: the retaining plate of the clamp is formed with an elastic tab facing the LGP, and the elastic tab abuts against the LGP to enhance the stability of the LGP.

5. A light guide plate (LGP) fixture of a backlight module, characterized in that: the LGP fixture comprises:
   a LGP;
   a heat dissipation base being planar and correspondingly disposed below the LGP, wherein at least one side of the heat dissipation base is formed with an upright wall extended upward therefrom; and a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the upright plate and the retaining plate are clamped on the heat dissipation base; and the clamps corresponding to each other position the LGP.

6. The LGP fixture of the backlight module according to claim 5, characterized in that: the upright wall is provided with a light source assembly which has a light emitting direction facing a light input surface of the LGP.

7. The LGP fixture of the backlight module according to claim 5, characterized in that: an upper surface of the heat dissipation base further comprises a plurality of first ribs and second ribs, wherein the first ribs are disposed below the LGP to support the LGP, and the second ribs are disposed between the upright wall and the penetration portion of the heat dissipation base to abut against the retaining plate.

8. The LGP fixture of the backlight module according to claim 7, characterized in that: the second rib is provided with a light source assembly thereon, and the light source assembly has a light emitting direction facing a light input surface of the LGP.

9. The LGP fixture of the backlight module according to claim 7, characterized in that: the retaining plate of the clamp is formed with an elastic tab facing the second rib of the heat dissipation base, and the elastic tab abuts against the second rib of the heat dissipation base to enhance the stability of the clamp.

10. The LGP fixture of the backlight module according to claim 5, characterized in that: the retaining plate of the clamp is formed with an elastic tab facing the LGP, and the elastic tab abuts against the LGP to enhance the stability of the LGP.

11. The LGP fixture of the backlight module according to claim 5, characterized in that: the bottom portion of the clamp is formed with an opening, and the heat dissipation base is correspondingly formed with a thread hole, so that a screw member is provided to fix the clamp on the heat dissipation base.

12. The LGP fixture of the backlight module according to claim 5, characterized in that: the penetration portion of the heat dissipation base is a close slot.

13. The LGP fixture of the backlight module according to claim 5, characterized in that: the penetration portion of the heat dissipation base is an open notch.

14. A backlight module, characterized in that: the backlight module comprises:

a light guide plate (LGP);

a heat dissipation base being planar and correspondingly disposed below the LGP, wherein at least one side of the heat dissipation base is formed with an upright wall extended upward therefrom;

a plurality of clamps, wherein the heat dissipation base is installed with the clamps on at least two opposite sides of the LGP; and each of the clamps has a bottom portion; a retaining plate and at least one upright plate are vertically formed from the bottom portion; the upright plate abuts against the upright wall of the heat dissipation base; the retaining plate passes through a corresponding penetration portion of the heat dissipation base; the upright plate and the retaining plate are clamped on the heat dissipation base; and the clamps corresponding to each other position the LGP;

a back plate disposed below the heat dissipation base to cover the heat dissipation base and the clamps; and a housing fixing the LGP from top to bottom.

15. The backlight module according to claim 14, characterized in that: the upright wall is provided with a light source assembly which has a light emitting direction facing a light input surface of the LGP.

16. The backlight module according to claim 14, characterized in that: an upper surface of the heat dissipation base further comprises a plurality of first ribs and second ribs, wherein the first ribs are disposed below the LGP to support the LGP, and the second ribs are disposed between the upright wall and the penetration portion of the heat dissipation base to abut against the retaining plate.

17. The backlight module according to claim 16, characterized in that: the retaining plate of the clamp is formed with an elastic tab facing the second rib of the heat dissipation base, and the elastic tab abuts against the second rib of the heat dissipation base to enhance the stability of the clamp.

18. The backlight module according to claim 14, characterized in that: the retaining plate of the clamp is formed with an elastic tab facing the LGP, and the elastic tab abuts against the LGP to enhance the stability of the LGP.

19. The backlight module according to claim 14, characterized in that: the bottom portion of the clamp is formed with an opening, and the heat dissipation base is correspondingly formed with a thread hole, so that a screw member is provided to fix the clamp on the heat dissipation base.

20. The backlight module according to claim 14, characterized in that: the penetration portion of the heat dissipation base is a close slot or an open notch.

\* \* \* \* \*